Patented June 19, 1945

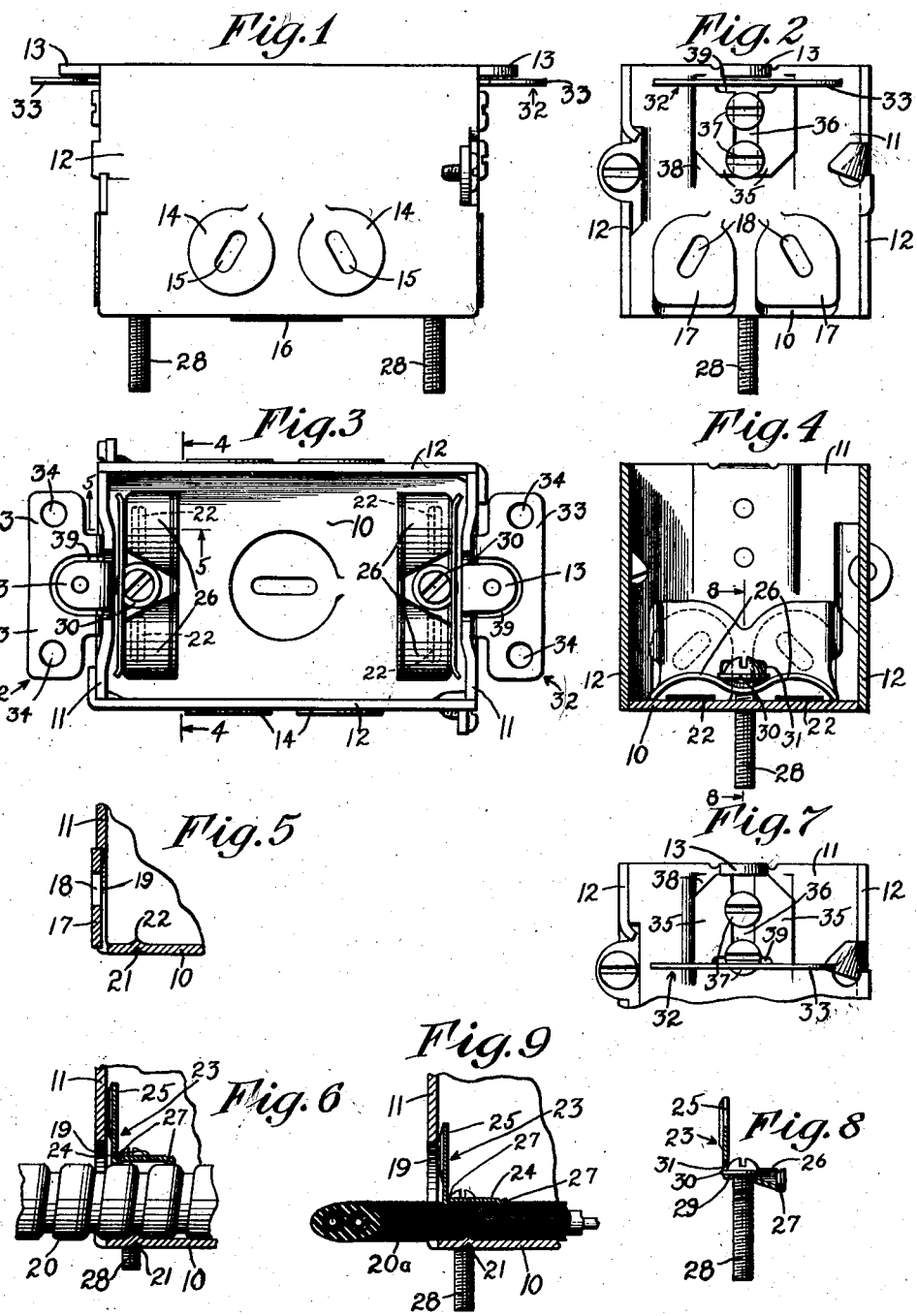

2,378,529

UNITED STATES PATENT OFFICE 2,378,529

OUTLET BOX

Merritt B. Austin, Jr., Winnetka, Ill.

Application October 24, 1940, Serial No. 362,515

6 Claims. (Cl. 285—24.5)

This invention relates to outlet boxes for electrical systems, and is concerned more particularly with means for facilitating the insertion of flexible insulated conductors including cables or conduits, with preventing injury to the conductors or their insulation, and yet providing for the firm and rigid securement of the conductors to the outlet box.

Heretofore, in the interior of outlet boxes there has been provided a clamping member which is drawn toward the bottom of the box by a screw to engage and hold the conduit entering through a knockout or pry-out hole in the box. Generally, the clamping member, having only a one-way connection to the clamping screw, lies in a position blocking the entrance to the box provided for by the knockout hole, thus necessitating the separate manual operation of raising the clamp as the conductor is inserted into the box.

Attempts have been made to obviate this difficulty by providing springs between the clamping member and the bottom of the box, but, due to looseness of the parts and limited space and the rather rough construction of the clamp necessitated by economy, cramping and jamming of the clamp occurred with the result that the manual operation of clearing the clamp from in front of the entrance opening usually had to be performed by hand, in spite of the presence of a spring. Besides this, the spring added to the cost of the device.

A feature of the present invention is the arrangement between the clamping screw and the clamping plate so that by merely backing off or unscrewing the screw, the clamping plate is raised so that the clamping surfaces thereof are clear of the entrance holes. This is accomplished, in the form of the invention herein disclosed, by providing a flange on the clamping screw which engages a slot on the clamping plate and makes a two-way driving connection between the clamping screw and the clamping plate, and thus, when the clamping screw is retracted, the clamping plate is retracted with it.

Another difficulty with outlet boxes as heretofore manufactured results from the fact that the knockout hole was so placed as to leave a ledge between the bottom of the outlet box and the bottom of the hole. This ledge facilitated clamping of the conduit to the outlet box, but it also, especially when used with nonmetallic armored cable, tended to cut into the cable and destroy the insulation.

Another feature of the present invention is the provision of the knockout or pry-out holes in such a way that the bottom of the hole coincides with the bottom wall of the outlet box, and the knockout piece is substantially flat at the bottom so that the flat edge of the bottom of the box is presented to the cable or conduit which is inserted therein.

To give a gripping action between the bottom of the box and the conduit or cable directly under the surface of the clamping member, the box is indented slightly to form a flat V-shaped rib which will indent non-metallic armored cable to an extent sufficient to grip it without, however, cutting into the insulation.

The clamping plate cooperating with the ribbed bottom wall of the outlet box has downwardly extending ribs to bear on the upper part of the conductor so as to apply pressure thereto, particularly the nonmetallic armored conduit, both in front of and in back of the rib in the bottom of the outlet box.

Another feature of this invention is the provision of a plaster ear which, by simply reversing its mounting on the outlet box, may accommodate conveniently not only ordinary plaster and plaster board, but such heavier non-plaster wall boards as are now commonly used.

Other features and advantages will hereinafter appear.

Referring to the accompanying drawing:

Figure 1 is a side elevational view of an outlet box according to the present invention.

Fig. 2 is an end view of the outlet box shown in Fig. 1.

Fig. 3 is a plan elevation of the outlet box of Fig. 1.

Fig. 4 is a cross-section substantially along the line 4—4 in Fig. 3.

Fig. 5 is a fragmentary detail in cross-section substantially along the line 5—5 in Fig. 3, showing a knockout for forming an aperture to receive a cable and an indentation forming a ridge for engaging the wall of the cable adjacent said aperture.

Fig. 6 is a view similar to Fig. 5, showing the knockout removed and an armored cable section clamped in position in the aperture by the clamping means of the present invention.

Fig. 7 is a fragmentary end view of the outlet box as shown in Fig. 2, showing a variation of the method of securing the fastener or bracket to said outlet box.

Fig. 8 is a detail in cross-section along the line 8—8 in Fig. 4, showing a cable clamp and draft means therefor.

Fig. 9 is a view similar to Fig. 6 showing a nonmetal armored cable clamped in position in the aperture of the outlet box.

Referring to the drawing, the outlet box is constructed of sheet metal or some other suitable material, and comprises a bottom wall 10, end walls 11, and side walls 12. The end walls 11 and bottom wall 10 are shown as integral, while the side walls 12 are removable to permit a plurality of boxes to be used side by side to form a gang box. At the upper edges of the said end walls 11 are formed attaching ears 13 for securing a cover plate to the box. Semipunched portions or knockouts 14 are provided in the side walls, said knockouts having slots 15 for the insertion of a screw driver or other suitable tool, whereby the said knockout may be pried outward and removed to form apertures in the said walls through which electrical conductors may be led into the box. A similar knockout 16 in the bottom wall 10 is provided which upon removal provides an aperture suitable for receiving electrical connections or for the attachment of the boxes to a bar hanger stud or other fixture supporting means.

In each of the end walls 11, there is a pair of inverted knockouts 17 having slots 18 for removing them by means of a screw driver.

According to the present invention, the knockouts 17 are D-shaped and are so located as to have the straight edge of the D coinciding with the line forming the junction of the bottom and end walls of the box as distinguished from apertures spaced from the bottom wall of the box, in which case a ledge is left between the margin of the aperture and the bottom wall, as, for instance, is shown in Fig. 1, where the knockouts 14 are so placed. The apertures 19 are adapted to receive flexible insulated electrical conductors such as cables or conduits. Since the bottoms of the apertures 19 are substantially flat, they are well adapted to receive oval nonmetallic armored cable which is sometimes used. By having the bottom of the aperture 19 coincident with the bottom wall 10 of the box, the cable may be easily slid into the box without interference with any opposing ledge, as would be in the case with the apertures resulting from the knockouts 14 in Fig. 1. By virtue of the extension of said apertures to the plane of the bottom wall of the box, such conductors may be clamped against the bottom wall 10 without danger of damaging the insulation of said conductors, since any sharp corners against which such conductors are clamped are eliminated.

Further, according to the present invention, means are provided upon the bottom wall 10 for engaging the insulation or covering of conductors, for instance, the armor of a cable 20 of Fig. 6, or the nonmetal armored cable 20a of Fig. 9 positioned in the aperture. An indentation 21 is formed in said bottom wall adjacent the lower edge of the aperture 19 which forms a V-shaped transverse ridge 22 on the inner surface of said bottom wall as shown in Fig. 5 for engaging the conduit.

Clamping means for securing a conduit in said aperture comprises an L-shaped clamping member 23 having one flange 24 extending parallel to the bottom wall 10 for engaging said conductor, and the other flange 25 extending upward, parallel to and engaging the end wall 11. Flange 24 is formed with two curved wings 26 for adapting the surface thereof to the curved surface of a conductor such as cable 20a. Ridges 27, formed in the cable-engaging surface of said flange, provide secure engagement between said clamping means and the surface of the cable.

The flange 25 extending upward from the flange 24 is adapted to cover the aperture 19 above said cable.

The clamping member 23 is adjustably secured to the bottom wall 10 of the box by draft means comprising a bolt 28 extending through a central hole 29 in flange 24, and threaded into the bottom wall 10. The head of said bolt is enlarged by a flange 30 which extends into an aperture or slot 31 in the flange 25 adjacent its junction with the flange 24.

In order to facilitate assembly of the bolt 28 with the member 23, the hole 29 is extended into slot 31, as shown in Fig. 8, insertion or removal of bolt 28 requiring merely the tilting of the latter with reference to the member 23 to permit the flange 30 to clear the upper edge of slot 31.

Upon rotating the bolt 28 for loosening the clamping member 23, the latter rises upward with the head of said bolt by virtue of the engagement of said enlargement 30 with said slot 31, and upon tightening, the head of bolt 28 engages the edges of the hole 29 in the member 23. As a result, when it is desired to insert a cable into the aperture 19, bolt 28 being withdrawn, the clamping member is held clear of said aperture providing maximum convenience for inserting said cable.

When the bolt 28 is tightened after inserting the cable, the latter is clamped between flange 24 and the bottom wall 10 of the box, ridge 22 on the latter and ridges 27 on the said flange securely gripping the insulation of the cable as shown in Fig. 9. Flange 25 covers the upper portion of aperture 19 above said cable, and engagement of said flange with the end walls 11 guides the clamping member 23 into the desired clamping position, and prevents tilting of said member whereby flange 30 could become disengaged from slot 31.

The invention also comprises novel adjustable means for securing the outlet box to a portion of a wall structure. The latter means comprises a pair of fasteners 32, each having a flange 33 which extends outward at right angles from the end walls 11 of the box and which is provided with means such as holes 34 for securing them to a part of a wall structure. A bifurcated plate, comprising two parallel tongues 35 forming a passage 36, is bent at right angles to flange 33 and is secured to the surface of the end wall 11 of the box by means of set screws 37, extending through the passage 36 and engaging the tongues 35 on either side thereof. Preferably, the surface of the end wall 11 is indented as indicated at 38 to provide means for guiding the edges of the tongues 35 and for retaining the flange 33 parallel to the upper edge of the box.

Adjacent the junction of the flange 33 and tongues 35, the passage 36 is widened sufficiently to accommodate the width of attaching ear 13 on the upper edge of end wall 11, and is extended into flange 33 as shown at 39 to permit the said fastener to be slid upward until it is flush with the upper edges of said box, the ear 13 fitting into the extended and widened portion of the passageway in the flange 33. The opening 39 which communicates with the passage 36 is also wider than the heads of the screws 37 whereby it is possible for removal to slide the member 32 downward past the said set screws merely by loosening the latter but without the necessity of removing them.

If desired, the position of member 32 as shown in Fig. 2, may be reversed in the manner shown in Fig. 7, by virtue of the widened portion 39 of the passage 36 extending into the flange 33. Such reversal may be conveniently effected without the removal of any other part of the box and as a result of this reversibility, the position of the flanges 33 may be adjusted within wide limits for securing the box at different levels with reference to the wall structure to which said flanges are attached for the purpose of accommodating varying thicknesses of wall covering, such as wallboard, plaster, lath, metal lath, etc.

Variations and modifications may be made within the scope of this invention and portions of the improvements may be used without others.

I claim:

1. In an outlet box comprising two adjoining angularly disposed walls and having an aperture in one of said walls for receiving an electrical conduit, said aperture having a straight edge coinciding with the juncture of the two walls, means adjacent said aperture for clamping an electrical conduit extending through the aperture and into the box against withdrawal therefrom, said means comprising stationary means carried by the other wall for engaging one side of said conduit; a movable clamping member for engaging the other side of said conduit; draft means threaded into said stationary means; and interengaging means on said draft means and said movable clamping member for moving the latter alternately and positively toward and away from said stationary means in response to rotation of said draft means.

2. In an outlet box comprising two adjacent walls forming a right angle and an aperture in one of said walls for receiving an electrical conduit, said aperture extending to the edge of the other wall at the junction of the two walls; means adjacent said aperture comprising a clamping member for clamping an electrical conduit extending through the aperture and into the box against the nonapertured wall, said member having a flange for engaging one side of said conduit, and a flange parallel to and engaging the apertured wall, and extending away from the other wall; draft means threaded into the latter wall for engaging the flange in contact with said conduit for moving the clamping member toward said wall; and means formed in the wall-engaging flange, and engaging a portion of said draft means for moving said clamping member away from said wall.

3. In an outlet box comprising two adjacent walls forming a right angle and an aperture in one of said walls for receiving an electrical conduit, said aperture extending to the edge of the other wall at the junction of the two walls; means adjacent said aperture comprising a clamping member for clamping an electrical conduit extending through said aperture and into the box against the nonapertured wall, said member having a flange for engaging the side of said conduit opposite the latter wall, and a flange parallel to and engaging the apertured wall, and extending away from the other wall; a bolt extending through the flange in contact with said conduit, and threaded into the conduit-engaging wall for moving said clamping member toward said wall; and a flange on the head of said bolt engaging an aperture in the wall-engaging flange of said clamping member, for moving said clamping member away from the conduit-engaging wall.

4. In an outlet box comprising two adjoining angularly disposed walls and an aperture in one of said walls for receiving an electrical conduit, means adjacent said aperture for clamping an electrical conduit extending through said aperture and into the box against withdrawal therefrom, said means comprising stationary means for engaging one side of the conduit, a movable clamping member for engaging the other side of the conduit and clamping it against the stationary means, draft means threaded into the other of said walls of the box and engaging said movable member for positively moving it toward the latter wall; and means carried by said movable member and releasably engaged and interlocked with said draft means for positively moving said member away from said wall, a portion of said movable member engaging the apertured wall to retain the member against rotation relative thereto.

5. In an outlet box comprising two adjacent walls forming a right angle, an aperture in one of said walls for receiving an electrical conduit; means adjacent said aperture comprising a clamping member for clamping an electrical conduit extending through the aperture and into the box against withdrawal therefrom, said clamping member having a flange for engaging one side of said conduit, and a flange parallel to and engaging the apertured wall extending away from the other wall; draft means threaded into the latter wall for engaging the conduit-engaging flange and moving the clamping member toward said wall; and means formed in the wall-engaging flange engaging a portion of said draft means for moving said clamping member positively away from said wall, said wall-engaging flange being disengageable from said draft means whereby said clamping member may be removed from said box without removing said draft means from said wall.

6. In an outlet box comprising two adjoining angularly disposed walls having an aperture in one of said walls for receiving an electrical conduit, clamping means adjacent said aperture for clamping the electrical conduit extending through the aperture and into the box against withdrawal therefrom, said means including a clamping member slidable over the wall having the aperture and draft means threaded into the other wall and having a continuous flange releasably interlocked with the clamping member to positively move the clamping member toward or away from the position in which it clamps the conduit to the box, the flange being released from the clamping member by a tilting movement of the member with respect to the draft means.

MERRITT B. AUSTIN, JR.